United States Patent [19]

Brahm et al.

[11] 4,024,307

[45] May 17, 1977

[54] POLYURETHANE SOLUTIONS

[75] Inventors: Helmut Brahm; Helmut Schulze, both of Erlenbach, Germany

[73] Assignee: Akzo N.V., Arnhem, Netherlands

[22] Filed: Feb. 24, 1975

[21] Appl. No.: 552,062

[30] Foreign Application Priority Data

Mar. 1, 1974 Germany .......................... 2409789

[52] U.S. Cl. ....................... 428/262; 260/32.6 NR; 260/77.5 MA; 427/246; 428/290; 428/425; 428/904
[51] Int. Cl.² ....................... B32B 7/00; C08K 5/17
[58] Field of Search .......... 260/77.5 MA, 77.5 AM, 260/77.5 AN, 77.5 SS, 32.6 NR, 77; 428/290, 262, 425, 904; 427/246

[56] References Cited

UNITED STATES PATENTS

| | | | |
|---|---|---|---|
| 3,236,811 | 2/1966 | Ellegast et al. | 260/77.5 MA |
| 3,457,326 | 7/1969 | Kienle | 260/77.5 MA |
| 3,635,907 | 1/1972 | Schulze et al. | 260/32.6 NR |

*Primary Examiner*—J. Ziegler
*Attorney, Agent, or Firm*—Johnston, Keil, Thompson & Shurtleff

[57] ABSTRACT

A process for the production of polyurethane solutions by reaction of a diisocyanate with a mixture of a glycol and a polymer bearing terminal hydroxy groups in a solvent medium under certain prescribed conditions. The resulting polyurethane solutions are especially valuable as impregnants or coating agents for textile substrates, for example in the preparation of a microporous synthetic leather.

30 Claims, No Drawings

POLYURETHANE SOLUTIONS

It is generally known that a polyester bearing hydroxy groups can be converted in molten form with a diisocyanate into a isocyanate-modified polyester which in turn can be further reacted with a glycol. As described in the Germain Pat. No. 831,772, this known process yields mostly crosslinked products of limited utility.

In German Pat. No. 888,766, it is taught that one can produce solutions of elastomers of the polyester series by using a solvent of the type known to be a solvent for polyacrylonitrile.

As explained by German Pat. No. 1,112,041, there are a number of disadvantages involved in attempting to use dimethyl formamide as the reaction medium for the conversion of diisocyanates into polyurethanes. In this reaction, the dimethyl formamide is not to be regarded as an inert solvent because it reacts with the added diisocyanate and thereby leads to undesirable side reactions.

It is an object of the present invention to provide an improved process for the preparation of polyurethane solutions which can be carried out in an especially simple manner to yield a polyurethane product with outstanding properties. Other objects and particular advantages of the invention are set forth in the following detailed description.

It has now been found, in accordance with the invention, that surprisingly good results are achieved in a reaction of hydroxy compounds with diisocyanates in a solvent provided that one proceeds by concurrently reacting a. one mol of a polyester or polyether having hydroxy end groups and a molecular weight of about 800 to 4000 and b. 1.2 to 9 mols of an aliphatic glycol of 2 to 9 carbon atoms in dimethylformamide together with c. a diisocyanate at a temperature of about 80° C. to 110° C., the reaction being carried out at a concentration in the solvent of about 25 to 45% by weight of the initial reactants. During this reaction, it is necessary to maintain a molar ratio of isocyanate groups (NCO-groups) to hydroxy groups (OH-groups) of about 1 +0.08, i.e. a very close 1:1 ratio with at most a variation of about 8% of either NCO-groups or OH-groups. The reaction is then stopped after reaching a viscosity of about 200 to 3,500 poise, measured at 20° C., by the addition of a monovalent alcohol. It is further preferable but optional to add a suitable stabilizer to the polymer solution after stopping the reaction.

The terms "polyester" and "polyether" are employed herein to refer to the hydroxyl-terminated polyesters and the polyalkyleneether glycols, respectively, as are commonly employed in the production of polyurethane solutions and shaped or structured polyurethane articles, including impregnated fabrics, webs or the like, the final polymer product being a substantially linear polyurethane of the elastomeric type. The diisocyanates used in the preparation of these elastomeric polyurethanes are also well known and include a number of aromatic, aliphatic and cycloaliphatic diisocyanates or mixtures thereof. Those glycols most commonly used in the number of polyurethane preparations are the alkylene glycols of 2 up to about 10 carbon atoms and preferably 2 to 6 carbon atoms.

For a general discussion of polyurethanes, attention is directed to such references as "Polyurethanes" by Dombrow, Rheinhold Publ. Corp. (1957) or "Poluurethanes:Chemistry and Technology" by Saunders and Frisch, Interscience Publishers of John Wiley & Sons (1962). Numerous patents are also readily available for a description of the polyurethanes and especially those used to make a synthetic leather, the following U.S. Patents being representative:

| | |
|---|---|
| 2,871,218; | 3,190,766; |
| 3,100,721; | 3,635,907; and |
| 3,180,853; | 3,645,775. |

The present invention is broadly applicable to all such linear polyurethanes and their related final products such as synthetic leathers, so that the monomeric materials for such polyurethanes are incorporated hereby by reference from the prior art.

Other more recent books which provide a general reference to polyurethanes, their preparation and use include:

"The Development and Use of Polyurethane Products" by E. N. Doyl, McGraw-Hill Book Co. (1971);

"Organic Polymer Chemistry" by K. J. Saunders, pages 318–346, Chapman and Hall Ltd., London (1973).

As hydroxyl-terminated polyesters and polyethers, polyethlene adipate and polytetramethylene glycol are especially suitable. For example, very good results can be obtained with a polyethylene adipate having a molecular weight of 1,000 to 3,000. Also suitable are mixed polyesters of adipic acid with ethylene glycol and butylene glycol-(1,4), particularly with a molar proportion of the butylene glycol of about 30 to 70%. Other very advantageous copolyesters are those of adipic acid with hexanediol(1,6) and neopentyl glycol wherein the proportion of the neopentyl glycol is most preferably about 30 to 70 mol %.

Very favorable results are also achieved with mixtures of polyesters and polyethers, especially a mixture of polyethylene adipate with polytetramethylene glycol.

It can be especially advantageous to use the polyester and/or the polyether added together with the aliphatic glycol so as to provide a mixture of these components exhibiting a hydroxyl number of about 180 to 250. The ranges of 180 to 200 and 200 to 250 have special significance, especially in the preparation of a microporous synthetic leather.

The hydroxyl number of a substance is easily determined by reacting it with an acid anhydride such as succinic acid anhydride or pyromellitic acid anhydride and titrating the carboxylic groups thereby formed with an alkali solution, e.g. KOH. The hydroxyl number is specified as the amount of KOH consumed in milligrams per gram of the substance containing the hydroxy groups. It is understood, of course, that the consumption of KOH due to the presence of carboxylic groups already present must first be determined by a blank test and a corresponding deduction is then made so as to have a true measure of the hydroxyl number. Thus, the hydroxyl number becomes a very accurate measure of the actual hydroxy groups provided by the polyester and/or polyether taken together simultaneously with the glycol.

The hydroxyl number of the mixture can be varied, for example, by changing the proporation of the aliphatic glycol or the molecular weight of the polymers being used as component (a), i.e. the linear polyesters and polyethers having terminal hydroxy groups. By such variation of the hydroxyl number, the properties of the polyurethane solutions or the polyurethane products obtained therefrom can also be varied to suit different utilities of the final product. For example, in order to impregnate a textile substrate with the polyurethane, it is most favorable to use an initial mixture of components (a) and (b) with a hydroxyl number of about 180 to 200. On the other hand, in order to provide a polyurethane as a coating material suitable as an outer or cover layer in a synthetic leather, it is preferable to employ a mixture of (a) and (b) with a hydroxyl number of about 200 to 250.

As aliphatic glycols for the synthesis of the polyesters being used as component (a), ethylene glycol and particularly butanediol-(1,4k) are very good. It is also possible, however, to use any number of alkylenediols of up to about 12 carbon atoms, preferably 2-6 and especially 2-4 carbon atoms, including 2,2,4-trimethyl-hexanediol-(1,6), propanediol-(1,2) and neopentyl glycol. Such glycols may be used alone or in mixtures, especially with ethylene glycol as one compound of the glycol mixture used to form a mixed polyester. As the acid component of the polyester, adipic acid is especially advantageous. Other useful acids include for example azelaic acid, suberic acid and sebacic acid. Polyesters may also be derived from cyclic esters such as caprolactone.

In general, the polyethers as component (a) and the glycols as component (b) are provided by the same aliphatic glycols identified above as being useful in preparing the polyesters, ethylene glycol and butylene glycol-(1,4) being especially useful as the aliphatic glycol.

Other aliphatic, cycloaliphatic even aromatic or araliphatic glycols are also well known for use in this art for the preparation of polyurethane solutions and final polyurethane products, and these may also be selected for purposes of the present invention. For example, one may use diethylene glycol, cyclohexanediol-(1,4) or 1,4-ethoxycyclohexane, p-xylene glycol or the like as alternative glycols, and polyethers can be made by oxyalkylation of an alkylene diamine such as ethylene diamine or by using other oxyalkylated derivatives. The acid of the ester may also be a cycloaliphatic, aromatic or aralphatic compound, e.g. the phthalic acids or other available dicarboxylic acids. The less common glycol and acid components, especially of the type which do not result in linear or so-called elastomeric polyurethanes may be used in small proportions.

The above-described variations in the glycol, polyether and polyester components are well understood in this art so that the present invention is not intended as being limited to those components specifically disclosed and set forth in working examples. In general, one will select those components which are least expensive and of greatest commercial availability, for example by using any of the large number of commercial listings which often provide sufficient information to make suitable choices.

The hydroxyl-terminated polyesters or polyethers may obviously be used as homopolymers or copolymers. Also, different homopolymers can be used in admixture with each other. Likewise mixtures of homopolymers with copolymers or mixtures of copolymers with each other are equally useful. When using a mixture of a polyester:polyether combination, the molar ratio is preferably from 20:80 to 40:60. Especially suitable mixtures of this type are those in which the polyester is polyethylene adipate or polybutyleneethylene adipate and the polyether is polytetramethylene glycol.

It is particularly suitable for purposes of the present invention to use those hydroxyl-terminated polyesters and/or polyethers which have a reaction velocity constant $K_z = 1.0$ to $10 \times 10^{-3}$ or preferably 2 to $4 \times 10^{-3}$ liters per mol equivalent per second, measured in a reaction with 4,4'-diphenylmethane-diisocyanate in dimethyl formamide at 25° C. The so-called "reaction rate" or "reaction velocity" constant $K_2$ is the second order reaction rate constant which may also be expressed in units of "liters $\times$ mol eq$^{-1}$ $\times$ sec$^{-1}$" or more simply as "1./mol$\times$sec.".

It is most favorable to carry out the reaction of the polyester and/or polyether together with the aliphatic glycol to form the polyurthane with the diisocyanate at a temperature of approximately 90° C. to 95° C. It is generally useful to maintain the concentration of the initial reactants (or the corresponding reaction products) in the solvent reaction medium within limits of about 25 to 45% by weight and most preferably about 30 to 40% by weight.

The reaction is preferably run in such a manner that the molar ratio of NCO-groups to OH-groups is maintained between about 0.93 and 0.98, i.e. a molar ratio of NCO:OH of 0.93:1 to 0.98:1. This means that the hydroxy groups are preferably present in a slight excess of up to about 0.08 and preferably about 0.02 to 0.07.

In addition, it has been found that the best results are obtained if the prescribed molar ratio is maintained as constant as possible during most of the reaction. Thus, variations in the molar ratio having a value between 0.93 and 0.98 should vary by something less than $\pm$ 0.02 and preferably less than $\pm$ 0.01. Toward the end of the reaction, for example after about 90% of the functional groups have reacted with each other, the ratio of NCO:OH groups can be increased, preferably up to a value of about 0.98 $\pm$ 0.015, in order to achieve a final viscosity of between about 200 and 3,500 poise. After reaching this desired viscosity, the reaction is preferably stopped in known manner by the addition of ethanol or another suitable monovalent alcohol, preferably adding this alcohol dissolved in dimethyl formamide.

As the stabilizer to be added after the reaction has been stopped, salicylic acid has proven to be especially suitable. This stabilizer as an additive is also preferably introduced into the reaction product as the stabilizing compound dissolved in dimethyl formamide. Other suitable stabilizers include ethylenediamine-tetraacetic acid and nitriloacetic acid by way of example. One may also optionally use such acids as hydrochloric acid and phosphoric acid as inorganic stabilizers.

The diisocyanate component (c) is selected from those which are commonly used in the preparation of polyurethanes, for example as listed in detail in the above-noted books and patents and incorporated herein by reference thereto. In providing an elastomeric linear polyurethane and especially a polyurethane to be used in making a microporous synthetic leather product, it is especially preferable to use an aromatic or arylene diisocyanate, i.e. with the isocyanate groups attached to an aromatic ring. Such organic diisocyanates may be used individually or in mixtures with each other in order to modify properties of the final product.

The use of diphenylmethane-4,4'-diisocyanate has proven to be especially useful for purposes of the present invention, but the following organic diisocyanates may also be used:

biphenylene-4,4'-diisocyanate;
tolylene-2,4-diisocyanate;
tolylene-2,6-diisocyanate;
meta-xylylene diisocyanate;
meta-phenylene diisocyanate;
4-chloro-1,3-phenylene diisocyanate;
naphthalene-1,5-diisocyanate.

As a general rule, the process of the invention can be carried out in the following manner. The polyester and/or polyether to be added may first be freed from water, e.g. to provide a substantially anhydrous material, preferably so that the water content is something less than about 0.1%. The polyester and/or polyether is mixed with the glycol and then supplied with or incorporated into the solvent which consists essentially of dimethyl formamide. It will be understood, of course, that the glycol component and the polyester and/or polyether component can also be separately dissolved in the required amounts in the dimethyl formamide and then the two solutions mixed together. It is also possible to introduce the glycol and the polymer components separately or together into the dimethyl formamide as a reaction solvent previously supplied to the reaction vessel.

It is important that the dimethyl formamide used as the solvent has the highest possible purity. A freshly distilled dimethyl formamide is most advantageous. The following criteria can be set forth to define the minimum standards of purity for the dimethyl formamide:

1. It should be practically free of amines, and the content of formic acid should be less than 0.02%.
2. Methanol and methyl formamide should be present in amounts of not more than 0.01% as determined by gas chromatographic analysis.
3. The water content, determined by the Karl Fischer method, is preferably no higher than 0.03%.

It is also of importance that the diisocyanate reactant be as pure as possible. For example, the preferred 4,4'-diphenylmethane-diisocyanate should contain an NCO-content of at least 99.5% of theory.

Not only does the molecular weight of the polymer component (a) play an important role in carrying out the reaction, but also of equal importance is the number of terminal hydroxy groups. Besides these essential characteristics, however, the polymers can be of substantial importance. For example, polyesters of different sources or even different runs or batches from the same source may have the same molecular weight and the same hydroxyl number but still behave quite differently in the process of the invention, frequently failing to react in the desired manner or even leading to undesirable products. This is likewise true of the polyether as well as the polyester.

It is therefore especially favorable to use a polyester or polyether which has a reaction rate or velocity constant $K_2$, measured in a reaction with 4,4'-diphenylmethane-diisocyanate in dimethyl formamide at 25° C., of from 1.0 to 10 × 10$^{-3}$ l./mol×sec. and preferably 2 to 4 × 10$^{-3}$ l./mol×sec. This kinetic measurement is relatively standard in this art although reported data of the second order reaction rate constant $K_2$ will vary in this art depending upon the diisocyanate used and the temperature of the reaction. Therefore, all measurements of $K_2$ herein are made with 4,4'-diphenylmethane-diisocyanate at the specified temperature of 25° C. and with dimethyl formamide as the solvent. The reaction is then followed by UV-spectographic tests at a wavelength of 300 nm. (i.e. 300 millimicrons or 300 × 10$^{-9}$ meters). For the determination of the reaction rate constant $K_2$, the reaction is conducted at three different concentrations, namely at 0.1 and 0.15 and also 0.2 mol equivalents of the polyester or polyether per liter. Further details about this determination of the reaction rate constant in the formation of urethanes in dimethyl formamide are to be found in the article by G. Borkent and J. J. van Arzten in Recueil, Vol. 91 (1972), pages 1079–1087. The kinetic measurements described in this article can be assigned to the determination of the activities of the polyester or polyether component of the present invention.

During the reaction, the temperature is held within a range of about 80° C. to 110° C. by cooling or heating the reaction mixture. It is recommended that the reaction be conducted within this temperature range at a temperature which is kept as constant as possible. A temperature of approximately 90°–95° C. is especially suitable.

The viscosity is continuously or frequently measured over the course of the reaction and the NCO-value is determined at specific intervals. The reaction is preferably conducted so that the molar ratio of NCO-groups to OH-groups amounts to about 1 ± 0.08. Preferably this molar ratio is maintained in a range of about 0.93 to 0.98. This means that the reaction is advantageously controlled by the addition of an appropriate amount of diisocyanate or glycol in the event that the molar ratio diverges from the desired value during the course of the reaction.

Upon reaching the desired viscosity, the reaction is stopped by the addition of a monovalent alcohol. It is preferable to add this alcohol dissolved in dimethyl formamide so that it is immediately dispersed or mixed into the reaction medium. In general, it is sufficient if a slight excess of the monovalent alcohol is added with reference to the NCO-groups still present. More preferably, however, the monovalent alcohol may be added in substantial excess, for example 10X or more with reference to the unreacted NCO-groups. Ethanol is preferred as the monovalent or so-called monofunctional reaction-stopping alcohol.

The final viscosity achieved in accordance with the invention should lie between about 200 and 3,500 poise, measured at 20° C. The viscosity to be established in each case depends in part upon the concentration at which the reaction is carried out, i.e. the proportion or percentage by weight of the initial reactants or the corresonding reaction products. Otherwise, the viscosity is based upon the molecular weight desired in the final product which in turn depends upon the special end use intended for the polyurethane product.

The monovalent alcohol is preferably injected into the stirred or agitated reaction solution, i.e. it is not simply poured onto the surface of the reaction mixture so as to be dispersed only slowly, but instead it is introduced into the interior of the reaction solution by means of one or more jet or injection devices, i.e. preferably with injection at several points within the reaction solution. This procedure ensures the rapid dispersal of the monovalent alcohol, especially when it is dissolved in dimethyl formamide prior to its injection, thereby bring the reaction to a rapid stop.

The molecular weight of the polyester or polyether having terminal hydroxy groups should ordinarily be about 800 to 4000. The terminal groups on these polymers should consist essentially of hydroxy groups, i.e. in the sense of having a hydroxyl or alcohol function. The proportion of carboxyl groups as terminal groups should be as low as possible. For example, the acid number of these polymers, which is a measure of the number of terminal carboxy groups, should lie below 1.0 and can generally be much lower except where difficult to completely avoid in the case of polyesters or mixed polyethers/polyesters or their copolymers.

It has been found that the success of the process according to the present invention frequently depends directly on the so-called activity of the polymers being introduced as component (a). Thus, depending upon the polymers required in the final product, namely the specific polyesters or polyethers, one may find that they either possess an activity which is too high or one which is too low. For this reason, it is especially advantageous if the initial polyester or polyether reactants are first deactivated and then the desired activity introduced by the addition of one or more activators. Suitable activators include especially the tertiary amines known for this purpose, for example 1,4'-diaza(2,2,2)-bicyclooctane as a preferred activator. It is also especially advantageous if the polyester or polyether being activated is essentially free of troublesome heavy metal compounds, especially iron compounds. In defining polymers which are essentially free of heavy metal compounds in the context of the present invention, it is meant that the corresponding heavy metal ions cannot be detected by the usual "complexometry" or complexing methods as given, for example, in Küster-Thiel (1962), page 40.

In an especially advantageous embodiment of the process of this invention, polyesters and/or polyethers are used which have first been deactivated and then adjusted by addition of an activator to an activity represented by $K_2 = (1.0 \text{ to } 10) \cdot 10^3$ and preferably $(2 \text{ to } 4) \cdot 10^{-3}$ l./mol $\times$ sec.

The deactivation of the polyesters or polyethers being used can be accomplished by various methods. This depends upon the impurities which are present in the polyester or polyether. Therefore, a deactivation can be effected for some impurities in the initial polymer by conventional distillation or rectification methods. Another approved method for deactivation is a treatment of the polymer with an acid or an acid-reacting agent, for example by using dilute hydrochloric acid, phosphoric acid or sulfur dioxide. Such deactivation as well as a number of useful activating additives are well known in this art so that further elaboration should not be necessary. Once deactivated, one can readily predetermine the exact amount of any desired activator to be introduced into the reaction medium so as to easily achieve the most preferred activity, i.e. 2 to $4 \times 10^{-3}$ l./mol $\times$ sec.

As has already been indicated, the viscosity of the produced solution of about 200 to 3,500 poise depends in part on the molecular weight of the polyurethane which in turn is a function of the selected molar ratio of NCO-groups to OH-groups. In general, the molecular weight will be higher as said molar ratio approaches more closely to a value of 1.0 in carrying out the reaction. It is often difficult, however, to hold this ratio to a value of exactly 1.0 during the reaction. In particular, the danger exists that in spite of careful control or supervision of the reaction, considerable fluctuations will occur so as to lead to a product which does not have the intended properties. For this reason, it has been found to be especially advantageous to carry out the reaction in stages, at first proceeding up to about a 90% conversion of the functional reactive groups with a ratio of NCO-groups to OH-groups maintained between about 0.93 to 0.96 ± 0.02 and thereafter up to the completion of the reaction by addition of the diisocyanate such that said ratio increases up to about 0.98 ± 0.015.

In order to improve the stability of the polyurethane solution obtained as the initial reaction product, a stabilizer may be suitably added. Among a number of known stabilizers, salicylic acid has proven to be of particular value. Only small amounts of the stabilizer are required, usually in an amount of about 0.01 to 0.1% by weight with reference to the dissolved amount of the polyurethane.

The process according to the invention leads to polyurethane solutions with outstanding properties in an especially simple and well controlled manner. Thus, it is possible with the conditions of the invention to obtain a stable polyurethane solution in a proportionately shorter period of time. In general, the reaction time will be between one hour and three hours. Surprisingly, products are obtained in the process of the invention which are practically free of crosslinking. Undesirable side reactions do not take place. At the same time, relatively highly concentrated polyurethane solutions are produced by the process of the invention. Therefore, it will be apparent that this process is extremely economical since the reaction takes place very rapidly and proceeds at high concentrations of the reactants or their products.

The polyurethane solutions obtained as products can be directly diluted by the addition of more solvent without requiring any special precautions so that these products can be employed in many areas of final utility. The dissolved polyurethane can be wet spun or dry spun into filaments or suitably into films, bands or the like. It will be understood, of course, that the polyurethane may also be isolated from the solvent by precipitation and/or evaporation. The resulting polyurethane may then be further processed, for example as a melt into shaped articles.

It is especially advantageous to use the polyurethane solutions of the invention in the impregnation or coating of textile substrates such as fabrics, webs, mats or the like, especially for use in the production of a synthetic microporous leather. This further process step or series of steps is accomplished in a generally well known manner. For example, the textile substrate or carrier material such as a fibrous fleece or non-woven web is impregnated with a solution of the polyurethane and is then treated with a non-solvent for the polyurethane, e.g. water, so as to coagulate the dissolved polyurethane. In coating steps, the already impregnated textile substrate or other suitable carrier is coated with a solution or gel of the polyurethane and also treated to achieve a microporous structure. One or several layers of a vapor-permeable but liquid-proof polyurethane containing microporous passages can thus be prepared from the polyurethane solution, following known procedures in coagulating or gelling the solution and subsequently washing out and drying the product. A number of the above-noted references describe processes of producing this type of synthetic microporous leather.

The invention is further explained by but not limited to the following examples.

EXAMPLE 1

46.0 kg. of polyethylene adipate having a molecular weight of 2,000 were dehyrated for 3 hours at 110° C. and 1 mm/Hg. This substantially water-free polyester was then dissolved in 140.5 liters of freshly distilled, anhydrous dimethyl formamide at room temperature, and 4.43 kg. of ethylene glycol were added thereto. The resulting mixture was heated to 70° C. and 24.73 kg. of diphenylmethane-4,4'-diisocyanate in flake form were rapidly added with very vigorous agitation. An exothermic reaction was immediately initiated with the temperature of the reaction solution rising within about 10 minutes up to a temperature of 90°–95° C. This temperature was then maintained over the further course of the reaction. Within about 2 – 3 hours, the viscosity of the solution rose up to about 2,000 poise (20° C.).

The course of the reaction was controlled by way of the increase in viscosity and the NCO-content of the reaction solution. The viscosity reading or determination can be accomplished most conveniently by way of the power input of the agitator or stirring assembly, it being possible to automatically record this power input so as to continuously monitor the solution viscosity. The measuring or indicating device or recorder may be previously calibrated by means of a routine continuous measurement of viscosity during an addition to the reactor of a liquid of known or otherwise carefully measured viscosity.

The determination of the NCO-content is accomplished in known manner by treatment of a sample with an excess of a primary or secondary aliphatic amine and then by back titration of the unused amine.

If the viscosity increase levels off or flattens out so that the desired viscosity is not achieved, then there must be a follow-up reaction, corresponding to the remaining NCO-content, by further addition of ethylene glycol dissolved in dimethyl formamide. As a rule, approximately 30 grams of ethylene glycol are sufficient in order to obtain the desired viscosity under the just described first working example.

When the viscosity reached the desired value as determined by the power input of the agitator or stirrer, the reaction was stopped by the addition of 200 grams of ethanol dissolved in 5.9 liters of dimethyl formamide. This effectively prevented any further increase of the viscosity or any after-reaction in the polyurethane solution obtained as the desired product. In order to stop the reaction as quickly and uniformly as possible, it was found to be desirable to inject the ethanol in dimethyl formamide as a stopping agent directly into the reaction mass, i.e., the reaction solution which has reached the required viscosity.

In order to stabilize the product as a useful polyurethane solution, 7.5 grams of salicylic acid in 1 liter of dimethyl formamide were then added to the product. After a further one-half hour long homogenization, the final polyurethane solution was drawn off and quickly cooled to a temperature of 50° C.

By evaporation of this final polyurethane solution as a coating on a glass plate, there was obtained a highly elastic, transparent film with the following properties:

| | |
|---|---|
| Elongation at break: | 650% |
| Ultimate strength: | 4.6 kg/mm² |
| Strain at 50% elongation: | 0.66 kg/mm² |
| Initial modulus: | 1.48 kg/mm² |
| Permanent extension: | 64% |

EXAMPLE 2

47.0 kg. of polytetramethylene glycol having a mol. wt. of 2,000 were dehydrated for 3 hours at 110° C. and 1 mm. Hg and then dissolved by the addition of 134 kg. dimethyl formamide. Then, after heating this solution to about 70° C., there was first added 4.14 kg. of ethylene glycol and, after good homogenization, 21.7 kg. of diphenylmethane-4,4'-diisocyanate in flake form were introduced, the temperature thereby rising within about 10 minutes to about 95° C. The temperature was then maintained at 95° C. over the further course of the reaction. After approximately one hour, the NCO-value of the reaction mixture had fallen practically to zero.

By the addition of another 1.8 kg. of diphenylmethane-4,4'-diisocyanate in portions of about 400 grams each time, the reaction was further conducted in stages until the desired viscosity was achieved. The reaction was then stopped with ethanol in the same manner as in Example 1 and the solution was stabilized with salicylic acid. Films of the polyurethane produced from this solution had the following properties:

| | |
|---|---|
| Elongation at break: | 750% |
| Ultimate strength: | 4.4 kg/mm² |
| Strain at 50% elongation: | 0.40 kg/mm² |
| Initial modulus: | 1.2 kg/mm² |
| Permanent extension | 49% |

EXAMPLE 3

50.0 kg. of polyethylene adipate with a mol. wt. of 2,000 were dehydrated for one hour at 130° C. and 1 mm. Hg and then dissolved in 101.4 kg. of dimethyl formamide. The resulting solution heated to about 70° C. was then admixed with 2.016 kg. of ethylene glycol and after good homogenization, with 15.6 kg. of diphenylmethane-4,4'-diisocyanate. Thereafter, the reaction proceeded as in Example 1. The polyurethane films produced from the final stabilized solution had the following properties.:

| | |
|---|---|
| Elongation at break: | 790% |
| Ultimate strength: | 4.3 kg/mm² |
| Strain at 50% elongation: | 0.26 kg/mm² |
| Initial modulus: | 0.78 kg/mm² |
| Permanent extension: | 42% |

EXAMPLE 4

1,000 grams of polyethylene adipate with a mol. wt. of 2,000 were dehydrated for one hour at 130° C. and 1 mm.Hg and then dissolved in 2,600 grams of dimethyl formamide. 111 grams of hexanediol-1,6 were added and the solution then heated up to about 70° C. Under good agitation, 340 grams of diphenylmethane-4,4'-diisocyanate were then rapidly introduced into the solution in flake form. The temperature of the mixture rose within about 10 minutes up to approximately 95°

C. and was then held at this value. By frequent measurement of the viscosity of the solution, e.g., by means of a viscometer, the course of the reaction was followed as based upon the increase in viscosity. With a leveling off of the increasing viscosity, the reaction was completed up to the desired viscosity by the addition in portions of a total of about 35 grams of diphenylmethane-4,4'-diisocyanate. Any further increase of viscosity was then prevented by introducing and stirring into the reaction mixture about 50 grams of ethanol in 70 grams of dimethyl formamide. The solution was finally drawn off after about a one-half hour homogenization, preferably dispersing salicyclic acid in the solution as the stabilizing agent.

Films produced from this polyurethane solution by evaporation had the following properties:

| | |
|---|---|
| Elongation at break: | 720% |
| Ultimate strength: | 3.5 kg/mm² |
| Strain at 50% elongation: | 0.50 kg/mm² |
| Initial modulus: | 1.20 kg/mm² |
| Permanent extension: | 55% |

EXAMPLE 5

22.5 kg. of polyethylene adipate with a mol. wt. of about 2,000, 1,437 kg. of ethylene glycol, 0.308 kg. of N-methyldiethanolamine and 9.85 kg. of diphenylmethane-4,4'-diisocyanate were reacted with each other in 63.35 kg. of dimethyl formamide in a manner analogous to Example 1. After about 1½ hours the reaction was completed and was effectively stopped by the addition of ethanol. After stirring in about 3.5 grams of salicylic acid as the stabilizing agent, which had been previously dissolved in 445 grams of dimethyl formamide, the polyurethane solution was drawn off under cooling. The polyurethane thus produced was dyed with an acid dyestuff, and it was found that this class of dyes is quite suitable in coloring the polymer.

The films obtained from this polyurethane solution had the following properties:

| | |
|---|---|
| Elongation at break: | 800% |
| Ultimate strength: | 2.83 kg/mm² |
| Strain at 50% elongation: | 0.33 kg/mm² |
| Initial modulus: | 0.9 kg/mm² |
| Permanent extension: | 42% |

EXAMPLE 6

30.0 kg. of polyethylene adipate having a mol. wt. of 2,000, 7.70 kg. of butanediol-1,4, and 27.6 kg. of diphenylmethane-4,4'-diisocyanate were reacted with each other in 121 kg. of dimethyl formamide in the same manner as followed with the reactants of Example 1. After about three hours, the viscosity had risen to 1,000 poise (20° C.) and the reaction stopped by the addition of ethanol. After the addition of 6.53 grams of salicyclic acid in 850 grams of dimethyl formamide for stabilizing the polyurethane solution, the final product was drawn off under cooling.

The films obtained from this polyurethane solution had the following properties:

| | |
|---|---|
| Elongation at break: | 500% |
| Ultimate strength: | 4.8 kg/mm² |
| Strain at 50% elongation: | 1.9 kg/mm² |
| Initial modulus: | 7.0 kg/mm² |
| Permanent extension: | 140% |

EXAMPLE 7

44.4 kg. of polybutylene adipate having a mol. wt. of 1,000 and 4.14 kg. of butanediol-1,4 were reacted in a manner analogous to Example 1 together with 22.5 kg. of diphenylmethane-4,4'-diisocyanate in 132 kg. of dimethyl formamide. After about 2½ hours, the viscosity of the reaction mixture had risen to 2,000 poise (20° C.) and the reaction was stopped by the addition of ethanol. The solution was then stabilized with 7.1 grams of salicylic acid dissolved in 950 grams of dimethyl formamide. The polyurethane solution drawn off as the product was cooled and made into films as in the preceding examples.

The resulting polyurethane had the following properties:

| | |
|---|---|
| Elongation at break: | 540% |
| Ultimate strength: | 3.07 kg/mm² |
| Strain at 50% elongation: | 0.5 kg/mm² |
| Initial modulus: | 1.0 kg/mm² |
| Permanent extension: | 57% |

EXAMPLE 8

10 kg. of polycaprolactone with a mol. wt. of 2,000 were dehydrated in about one hour at 130° C. at 1 mm.Hg and then dissolved in 23.9 kg. of dimethyl formamide. After heating the solution to about 70° C., there were added 437 grams of ethylene glycol and after thorough mixing about 3.13 kg. of diphenylmethane4,4'-diisocyanate in flake form. By adding in portions a further amount of 100 grams of the diisocyanate, the reaction was carried out as in Example 2 up to a viscosity of 2,000 poise(20° C.). After the reaction was stopped and the solution stabilized as in the preceding examples, the final solution was withdrawn under cooling.

Films produced from this polyurethane solution had the following properties:

| | |
|---|---|
| Elongation at break: | 750% |
| Ultimate strength: | 2.82 kg/mm² |
| Strain at 50% elongation: | 0.18 kg/mm² |
| Initial modulus: | 0.53 kg/mm² |
| Permanent extension: | 80% |

EXAMPLE 9

20.7 kg. of polyhexanediol carbonate with a mol. wt. of 1,800 were dehydrated within 1½ hours at 110° C. at 20 mm.Hg, dissolved in 65 kg. of dimethyl formamide and then reacted with 2.94 kg. of butanediol-1,4 and 11.0 kg. of diphenylmethane-4,4'-diisocyanate, again following the same procedure as in Example 2. In order to control the final stage of the reaction, a further amount of about 400 grams of the diisocyanate were required, being added in incremental portions according to the desired viscosity increase. After the reaction was stopped and the solution stabilized, the final polyurethane solution was drawn off with cooling.

Films produced from this polyurethane solution had the following properties:

| | |
|---|---|
| Elongation at break: | 500% |
| Ultimate strength: | 5.06 kg/mm² |
| Strain at 50% elongation: | 0.76 kg/mm² |
| Initial modulus: | 3.41 kg/mm² |
| Permanent extension: | 124% |

EXAMPLE 10

6.0 kg. of polyhexanediol carbonate with a mol. wt. of 1,800 and 4.0 kg. of polybutyleneethylene adipate with a mol. wt. of 2,000 were mixed together and dehydrated for 1.5 hours at 110° C. and 20 mm.Hg and then dissolved in 28 kg. of dimethyl formamide. After the addition of about 0.874 kg. of ethylene glycol and 5.0 kg. of diphenylmethane-4,4'-diisocyanate, the reaction proceeded in the same manner corresponding to Example 2. After about four hours, a viscosity of 2,000 poise (20° C.) was attained. The reaction was then stopped by adding 600 grams of ethanol in 650 grams of dimethyl formamide.

Films produced from this polyurethane solution after stabilization had the following properties:

| | |
|---|---|
| Elongation at break: | 725% |
| Ultimate strength: | 3.48 kg/mm² |
| Strain at 50% elongation: | 0.47 kg/mm² |
| Initial modulus: | 1.566 kg/mm² |
| Permanent extension: | 55% |

EXAMPLE 11

A commercial polymer powder (Carbopol 934), which is a very high molecular weight carboxy vinyl polymer based upon methacrylic acid, in an amount of 6.16 kg. was made up into a paste with 150 liters of dimethyl formamide, and after homogenization of this mixture, it was conducted over into an attached kettle with a temperature of 50° C. Then, after first slowly adding 35 kg. of water, there were further added in sequence 700 kg. of a polyurethane solution obtained as in Example 2, 7.28 kg. of a commercial silicone oil (Tegiloxan) and 72.94 kg. of a dye paste. The resulting mixture was homogenized for two hours at 50° C. to provide a paste-like coating agent which was then spread onto a fibrous web or fleece impregnated with a polyesterurethane as a substrate, using a doctor blade or wiper to provide a coating of uniform thickness. This coating was coagulated with water and washed. After drying, there was obtained a very uniformly stable microporous cover layer which is useful in synthetic leather applications.

EXAMPLE 12

Into a mixing kettle maintained at 50° C. and containing 1,361.1 liters of dimethyl formamide and 157.6 liters of water, there were added with mixing 1,312.5 kg. of the polyurethane solution obtained according to Example 1. After three hours of homogenizaton, the resulting mixture was used to impregnate a fibrous fleece which had been produced from a mixture of nylon-6 fibers (polycaprolactam), fibers of a copolyamide of caprolactam and hexamethylene diammonium adipate and also cellulose fibers. After coagulation and washing with water and then drying the impregnated fleece, one obtains a microporous fiber-reinforced polyurethane substrate which can then be provided with the cover layer of Example 11 to yield a finished synthetic leather product.

Variations in the above examples may be made in accordance with accepted practices in the polyurethane art without departing from the spirit or scope of the present invention.

The Invention is hereby claimed as follows:

1. In a process for the production of polyurethane solutions by reaction of hydroxy compounds with diisocyanates in a solvent consisting essentially of dimethylformamide, the improvement which comprises:
   concurrently reacting (a) one mol of a polyester or polyether having hydroxy end groups and a molecular weight of about 800 to 4000 and (b) 1.2 to 9 mols of an aliphatic glycol of 2 to 9 carbon atoms in said dimethylformamide together with (c) a diisocyanate at a temperature of about 80° C. to 110° C., the reaction being carried out at a concentration in the solvent of about 25 to 45% by weight of the initial reactants;
   maintaining a molar ratio of NCO-groups to OH-groups of about 1 ± 0.08 during the reaction; and
   stopping the reaction after reaching a viscosity of about 200 to 3500 poise, measured at 20° C., by addition of a monovalent alcohol.

2. The process of claim 1 wherein a stabilizer is added to the solution after stopping the reaction.

3. The process of claim 1 wherein polyethylene adipate is used as the polyester.

4. The process of claim 1 wherein polytetramethylene glycol is used as the polyether.

5. The process of claim 1 wherein a mixed polyester of adipic acid esterified with ethylene glycol and butylene glycol is used as the polyester.

6. The process of claim 1 wherein component (a) is a mixture of a polyester and a polyether.

7. The process of claim 6 wherein component (a) is a mixture of polyethylene adipate and polytetramethylene glycol.

8. The process of claim 1 wherein the simultaneously used components (a) and (b) taken together as a mixture have a hydroxyl number of about 180 to 200.

9. The process of claim 1 wherein the simultaneously used components (a) and (b) taken together as a mixture have a hydroxyl number of about 200 to 250.

10. The process of claim 1 wherein the polyester or polyether of component (a) exhibits a reaction velocity constant $K_2$=1.0 to 10 × $10^{-3}$ l./mol×sec. in a reaction with 4,4'-diphenylmethane-diisocyanate in dimethyl formamide at 25° C.

11. The process of claim 10 wherein said constant $K_2$=2 to 4 × $10^{-3}$ l./mol×sec.

12. The process of claim 1 wherein the reaction is carried out at a temperature of about 90° to 95° C.

13. The process of claim 1 wherein the concentration of initial reactants or the corresponding reaction products in the solvent during the reaction is maintained between about 30 and 40% by weight.

14. The process of claim 1 wherein the molar ratio of NCO-groups to OH-groups during the reaction is maintained constant in the range of 0.93 to 0.98 with a variation of not more than about ± 0.02.

15. The process of claim 1 wherein the molar ratio of NCO-groups to OH-groups during the reaction is maintained constant in the range of 0.93 to 0.98 with a variation of not more than about ± 0.01.

16. The process of claim 14 wherein the reaction is first carried out up to about 90% conversion of the functional reactive groups at a molar ratio of NCO-groups to OH-groups of between about 0.93 and 0.96 and thereafter the reaction is completed with the addition of the diisocyanate to increase said molar ratio to about 0.98 ± 0.015.

17. The process of claim 10 wherein the initially selected polyester or polyether of component (a) is deactivated and is used in combination with an activator to provide said constant $K_2 = 1.0$ to $10 \times 10^3$ l./mol×sec.

18. The process of claim 11 wherein the initially selected polyester or polyether of component (a) is deactivated and is used in combination with an activator to provide said constant $K_2 = 2$ to $4 \times 10^{-3}$ l./mol × sec.

19. The process of claim 1 wherein the polyester or polyether being used is essentially free of a heavy metal.

20. The process of claim 1 wherein ethanol is added as the monovalent alcohol used to stop the reaction.

21. The process of claim 20 wherein a solution of ethanol in dimethyl formamide is used.

22. The process of claim 2 wherein the stabilizer is salicylic acid.

23. The process of claim 22 wherein a solution of salicylic acid in dimethyl formamide is used.

24. The polyurethane solution obtained by the process of claim 1.

25. The process of claim 1 wherein the resulting polyurethane solution is used to impregnate or coat a textile substrate.

26. The process of claim 8 wherein the resulting polyurethane solution is used to impregnate or coat a textile substrate in the production of a microporous synthetic leather.

27. The process of claim 9 wherein the resulting polyurethane solution is used to impregnate or coat a textile substrate in the production of a microporous synthetic leather.

28. A coated textile substrate obtained by the process as claimed in claim 25.

29. A synthetic leather product obtained by the process as claimed in claim 26.

30. A synthetic leather product obtained by the process as claimed in claim 27.

* * * * *